United States Patent
Yamamoto et al.

(10) Patent No.: US 11,157,017 B2
(45) Date of Patent: Oct. 26, 2021

(54) VEHICULAR SYSTEM AND COURSE ESTIMATION METHOD

(71) Applicant: AICHI STEEL CORPORATION, Aichi (JP)

(72) Inventors: Michiharu Yamamoto, Aichi (JP); Tomohiko Nagao, Aichi (JP); Hitoshi Aoyama, Aichi (JP)

(73) Assignee: AICHI STEEL CORPORATION, Aichi (JP)

( * ) Notice: Subject to any disclaimer, the term of this patent is extended or adjusted under 35 U.S.C. 154(b) by 288 days.

(21) Appl. No.: 16/328,730

(22) PCT Filed: Aug. 24, 2017

(86) PCT No.: PCT/JP2017/030275
§ 371 (c)(1),
(2) Date: Feb. 27, 2019

(87) PCT Pub. No.: WO2080/043273
PCT Pub. Date: Mar. 8, 2018

(65) Prior Publication Data
US 2019/0196496 A1 Jun. 27, 2019

(30) Foreign Application Priority Data
Aug. 30, 2016 (JP) .............................. JP2016-168475

(51) Int. Cl.
*G05D 1/02* (2020.01)
*G08G 1/00* (2006.01)
(Continued)

(52) U.S. Cl.
CPC ........... *G05D 1/0259* (2013.01); *B60W 30/12* (2013.01); *B60W 40/06* (2013.01);
(Continued)

(58) Field of Classification Search
CPC .......... G05D 1/0259; G05D 2201/0213; G06F 16/29; B60W 30/12; B60W 40/06;
(Continued)

(56) References Cited

U.S. PATENT DOCUMENTS 5,828,968 A    10/1998  Iiboshi et al.
6,032,097 A *  2/2000   Iihoshi ................. G05D 1/0293
                                                      701/96
(Continued)

FOREIGN PATENT DOCUMENTS

CN        200947250 Y    9/2007
EP       1 046 568 A2   10/2000
(Continued)

OTHER PUBLICATIONS

International Search Report dated Nov. 14, 2017 for PCT/JP20171030275 filed on Aug. 24, 2017, 9 pages including English Translation.
(Continued)

*Primary Examiner* — Hunter B Lonsberry
*Assistant Examiner* — Elizabeth Yang
(74) *Attorney, Agent, or Firm* — Xsensus LLP

(57) ABSTRACT

A vehicular system (1) includes a lateral shift amount measurement part that has a plurality of magnetic sensors that senses magnetism of magnetic markers (10) arrayed along a vehicle width direction and measures a lateral shift amount that is a positional deviation of a vehicle (5) in a vehicle width direction with respect to the magnetic markers (10) and a course estimation part that uses a difference between the lateral shift amounts with respect to two magnetic markers (10) disposed with a space provided therebetween in a road surface (100S) where the vehicle (5) travels and estimates a deviation of the vehicle (5) in a traveling direction with respect to a line segment direction connecting the positions of the two magnetic markers.

21 Claims, 20 Drawing Sheets

(51) Int. Cl.
  *B60W 40/114* (2012.01)
  *B60W 30/12* (2020.01)
  *G08G 1/16* (2006.01)
  *G01B 7/00* (2006.01)
  *B60W 40/06* (2012.01)
  *G06F 16/29* (2019.01)

(52) U.S. Cl.
  CPC ............ *B60W 40/114* (2013.01); *G01B 7/00* (2013.01); *G06F 16/29* (2019.01); *G08G 1/00* (2013.01); *G08G 1/16* (2013.01); *G05D 2201/0213* (2013.01)

(58) Field of Classification Search
  CPC ......... B60W 40/114; G01B 7/00; G08G 1/00; G08G 1/16
  See application file for complete search history.

(56) References Cited

U.S. PATENT DOCUMENTS

| | | | | |
|---|---|---|---|---|
| 6,215,392 | B1* | 4/2001 | Okada | B62D 1/28 340/436 |
| 7,451,027 | B2* | 11/2008 | Peteri | B62D 1/28 180/167 |
| 9,063,548 | B1* | 6/2015 | Ferguson | B60W 30/12 |
| 2015/0247719 | A1* | 9/2015 | Huang | B62D 15/025 701/41 |
| 2018/0157878 | A1* | 6/2018 | Kovarik | G06K 7/10376 |

FOREIGN PATENT DOCUMENTS

| | | | | |
|---|---|---|---|---|
| JP | 8-161036 | A | | 6/1996 |
| JP | 9-128039 | A | | 5/1997 |
| JP | H10-105232 | A | | 4/1998 |
| JP | 2000-306195 | A | | 11/2000 |
| JP | 2001006923 | A | * | 1/2001 |
| JP | 2001-273033 | A | | 10/2001 |
| JP | 2007-219960 | A | | 8/2007 |
| JP | 2012174032 | A | * | 9/2012 |
| JP | 2016-091412 | A | | 5/2016 |

OTHER PUBLICATIONS

Extended European Search Report dated Jun. 23, 2020 in European Patent Application No. 17846278.4, 13 pages.

* cited by examiner

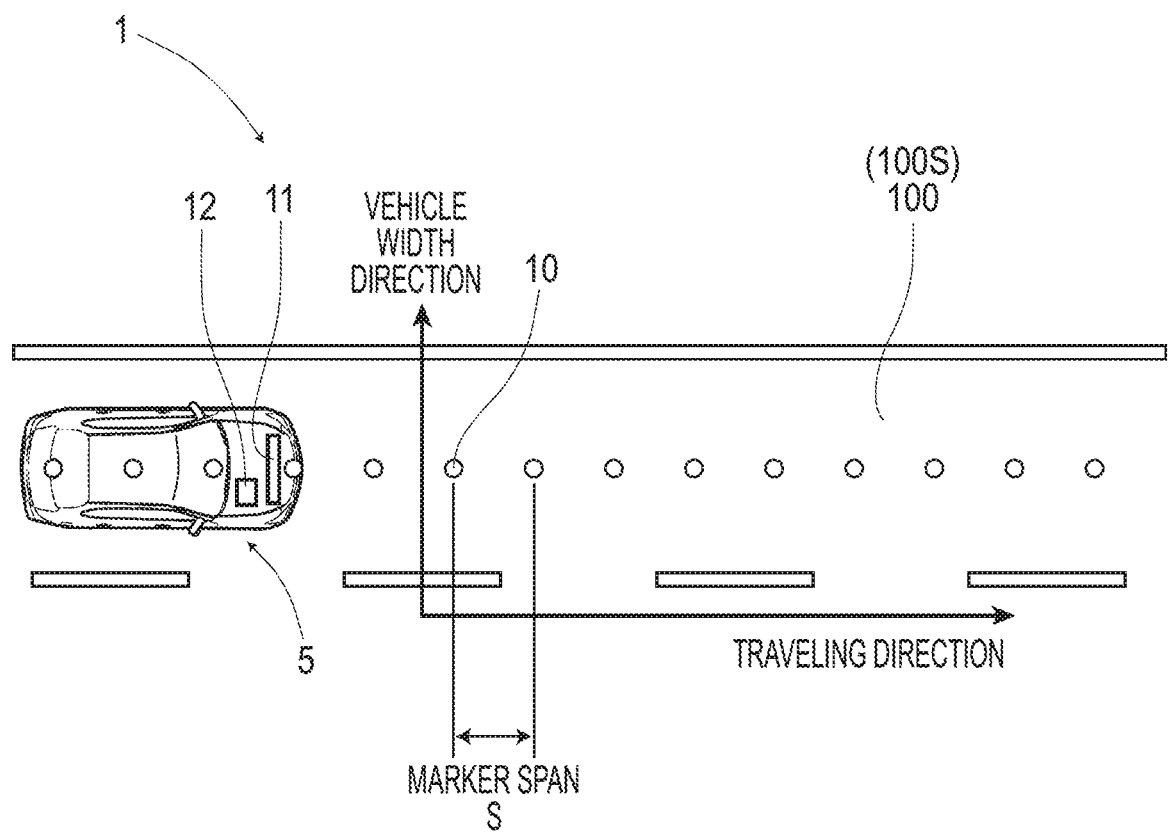
[FIG. 1]

[FIG. 2]
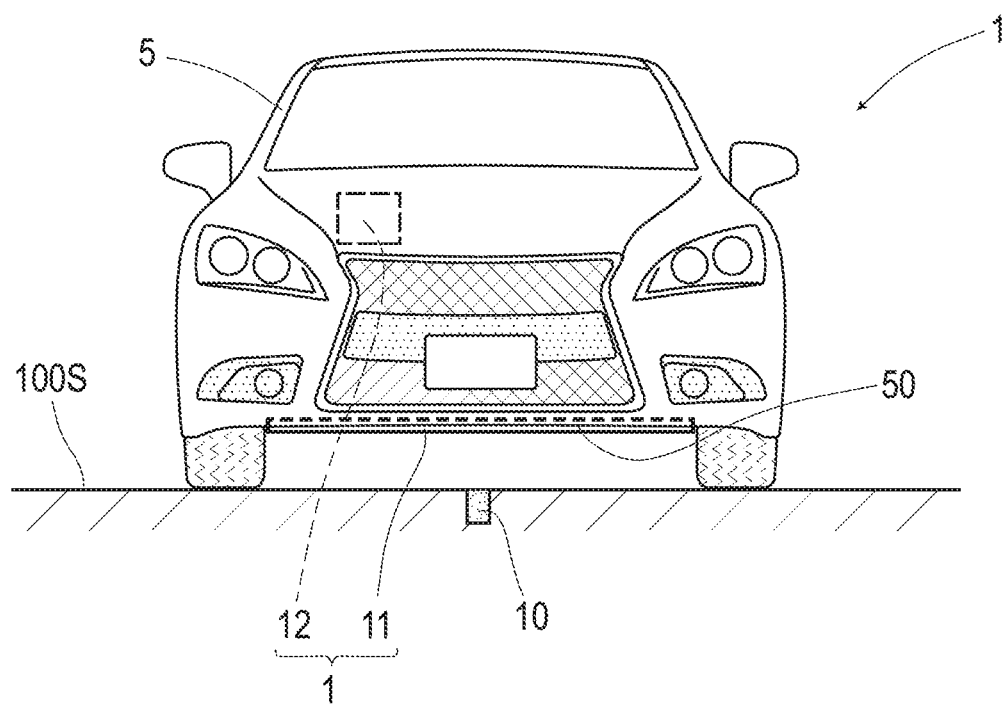

[FIG. 3]
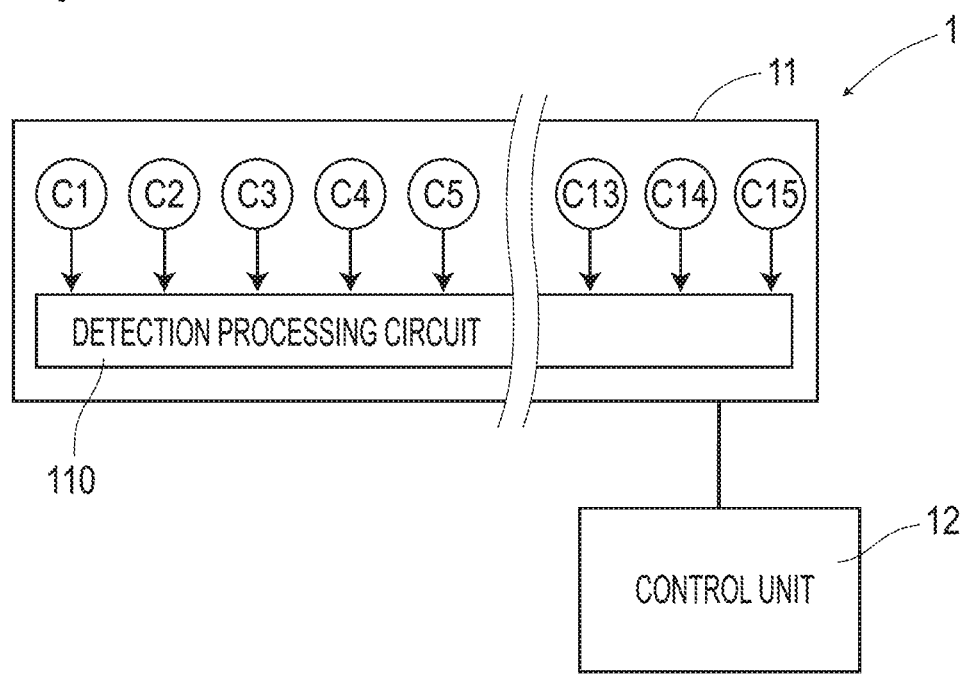

[FIG. 4]
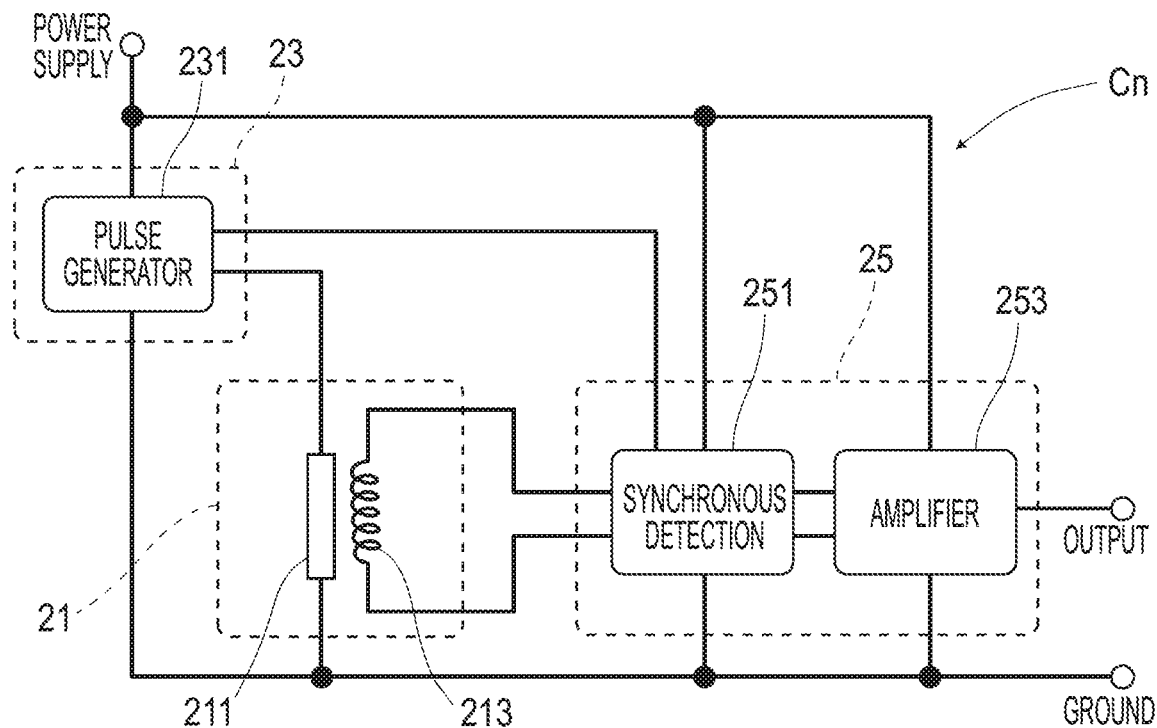

[FIG. 5]
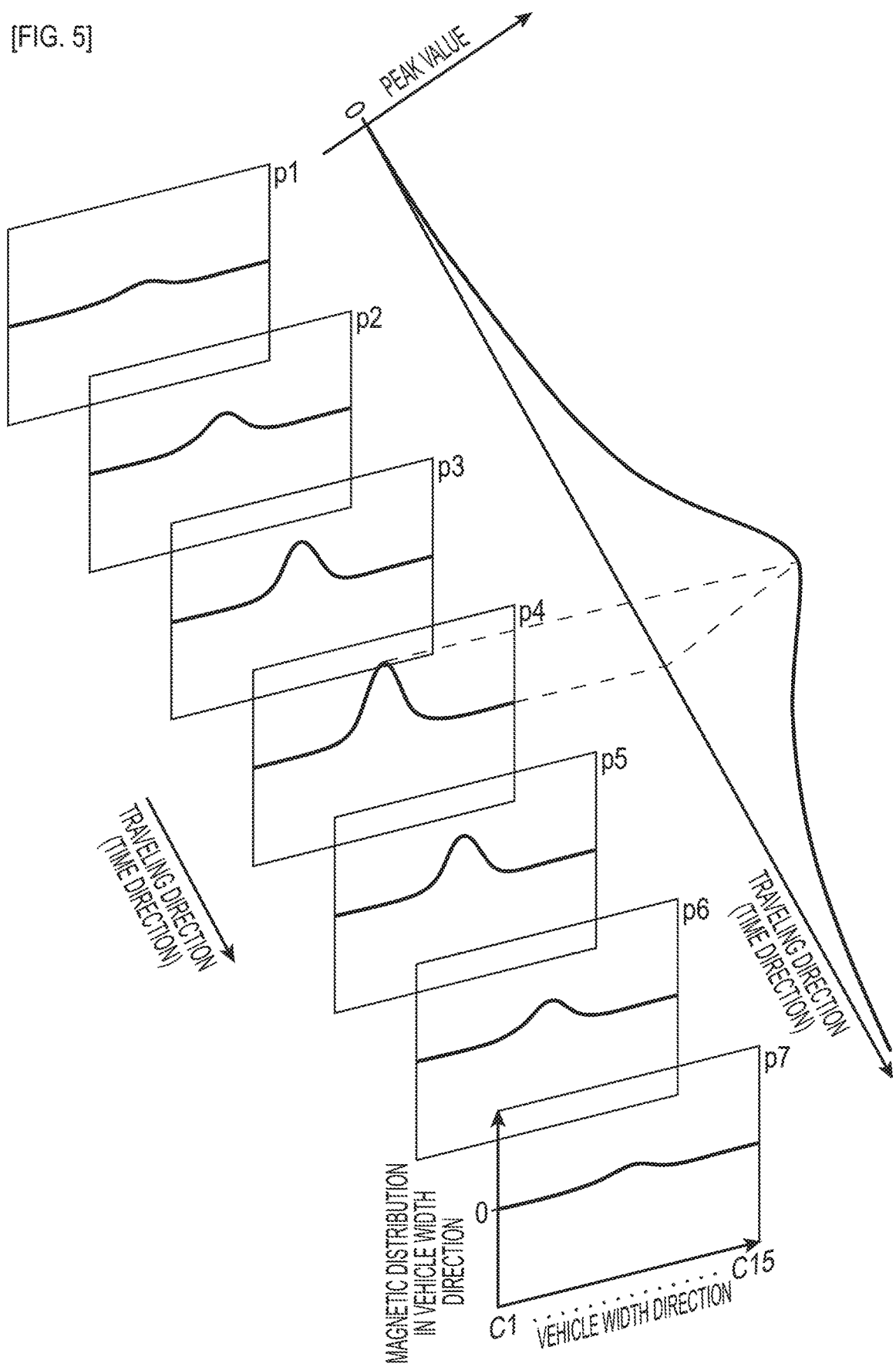

[FIG. 6]
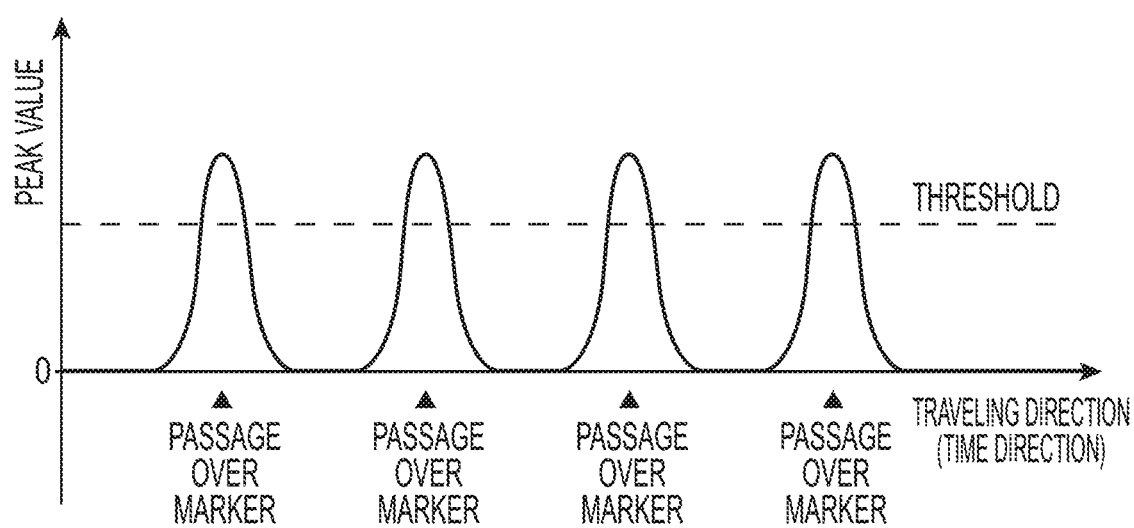

[FIG. 7]
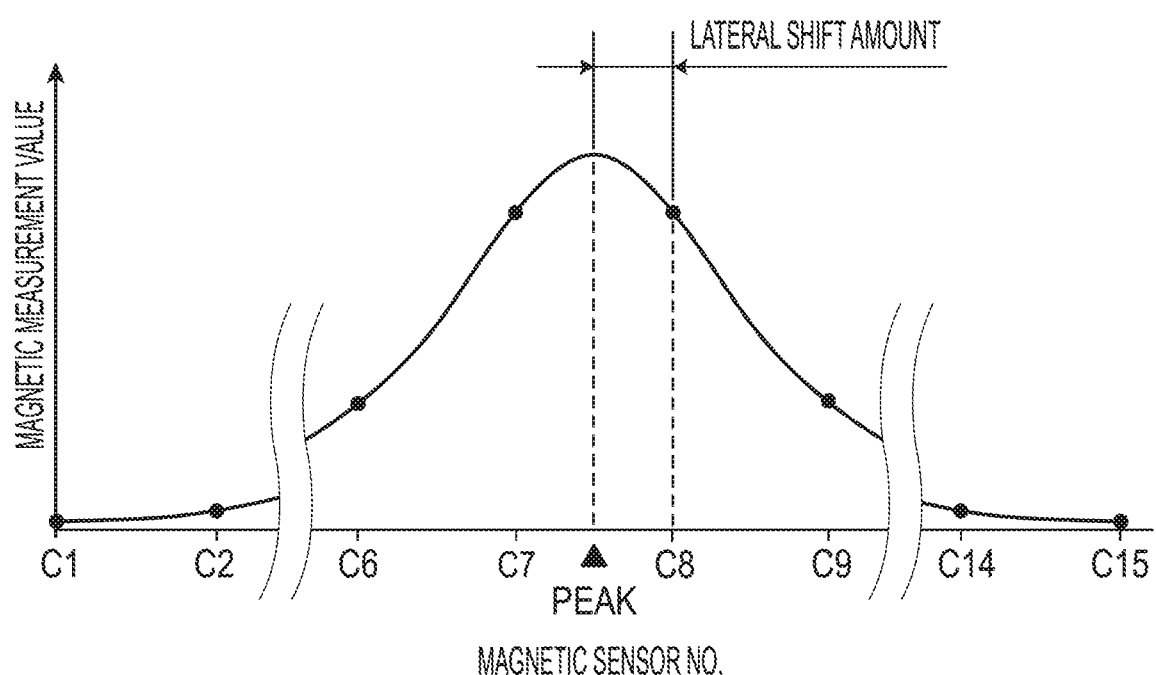

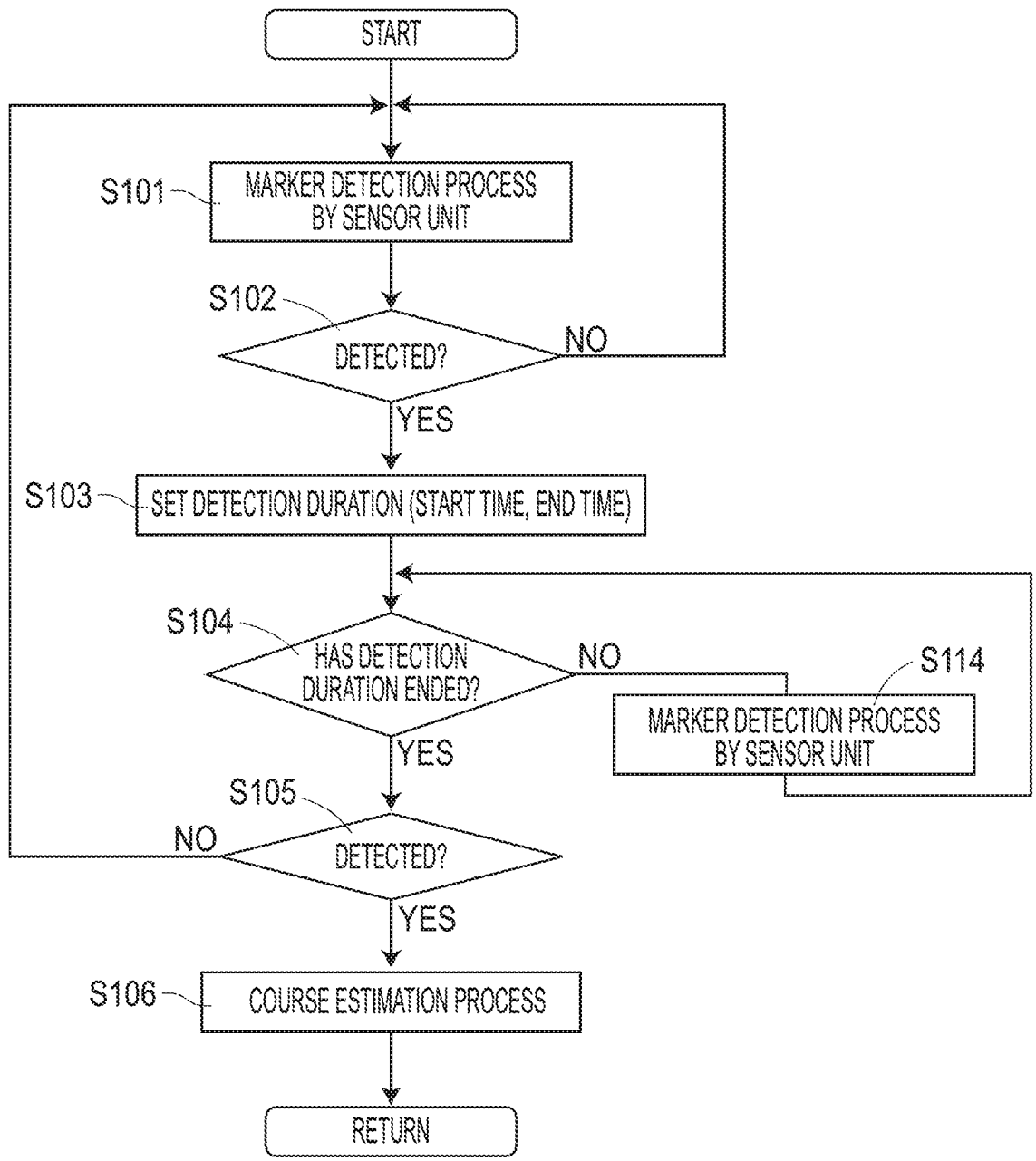
[FIG. 8]

[FIG. 9]
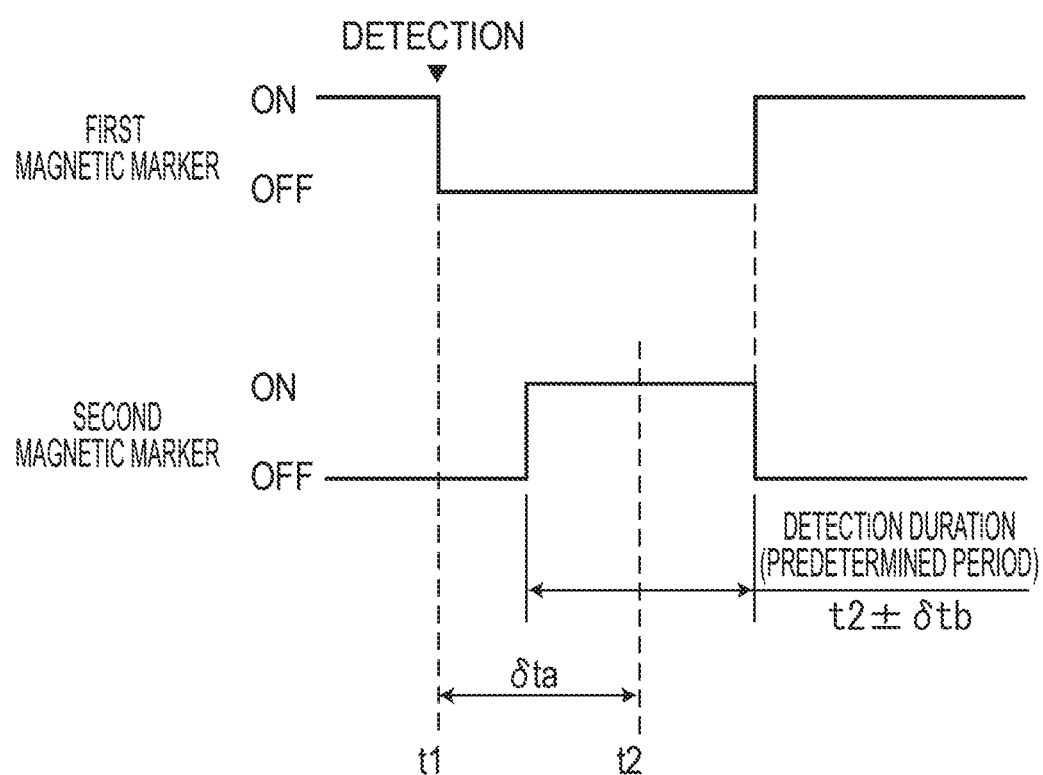

[FIG. 10]
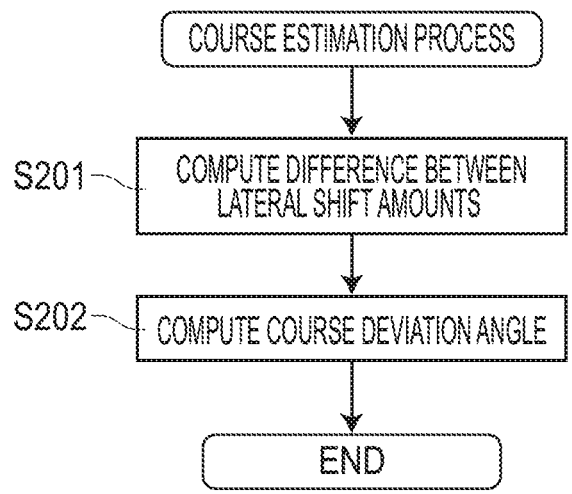

[FIG. 11]
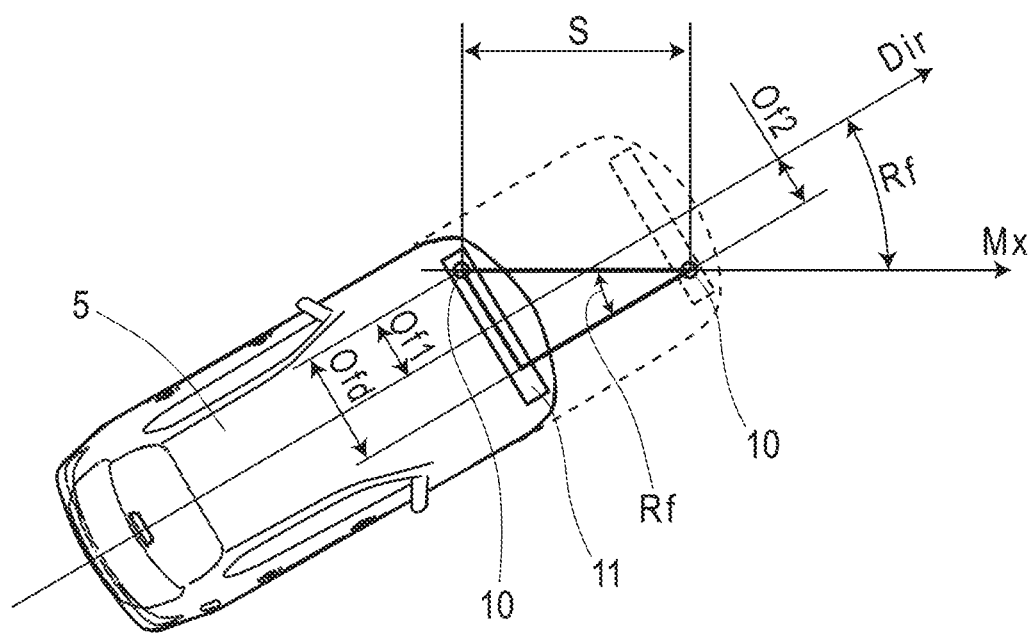

[FIG. 12]
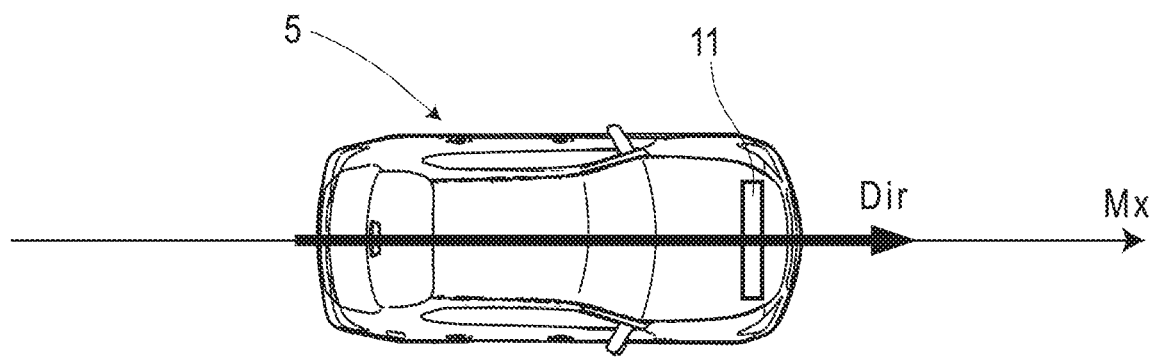

[FIG. 13]
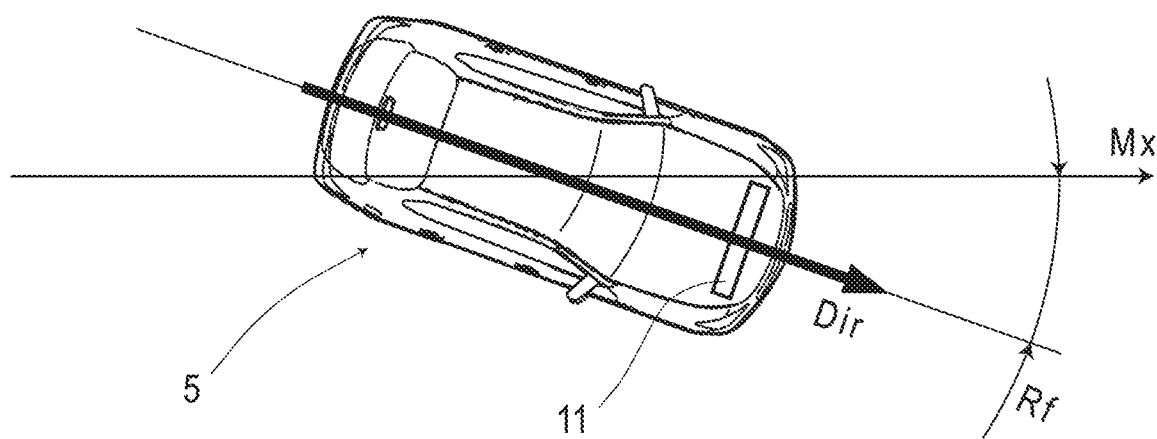

[FIG. 14]
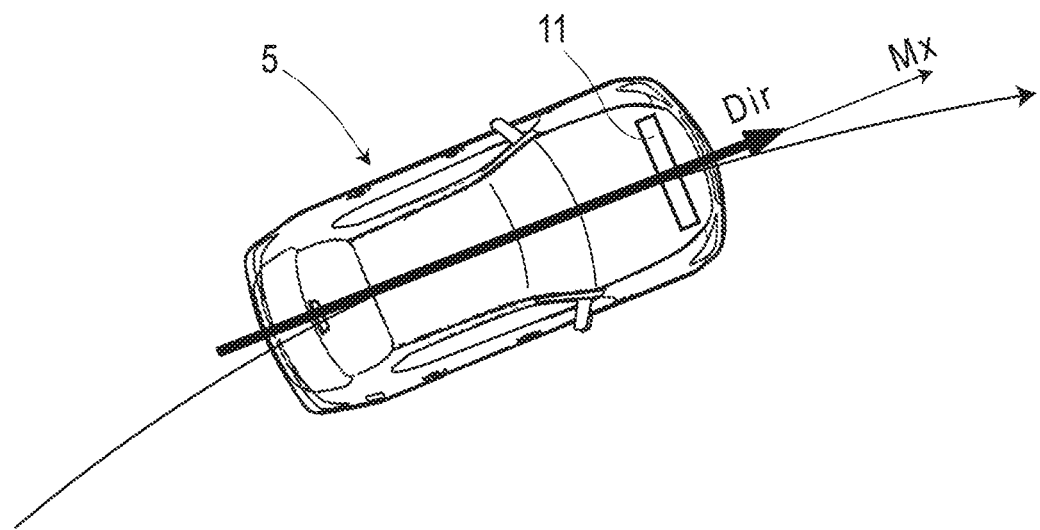

[FIG. 15]
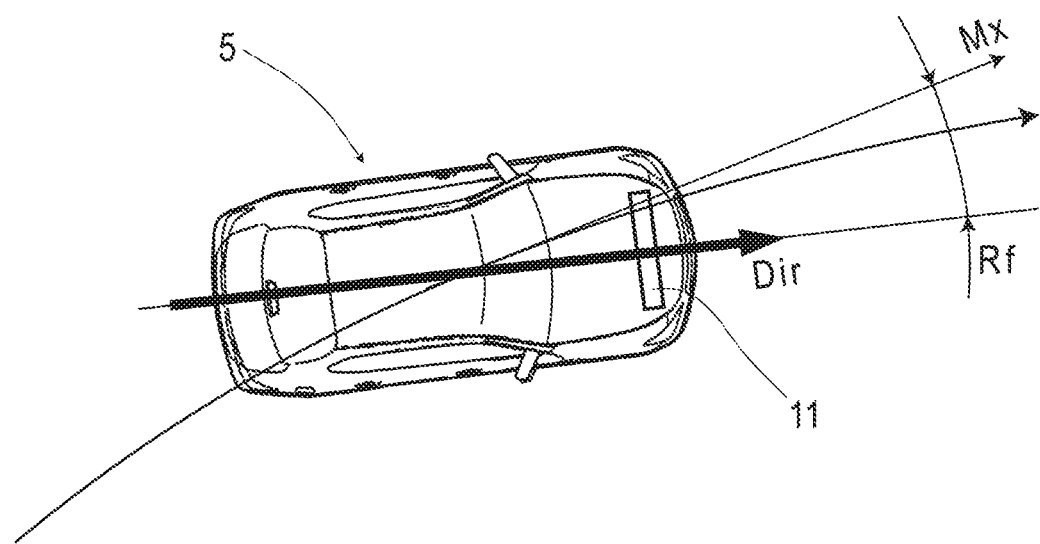

[FIG. 16]
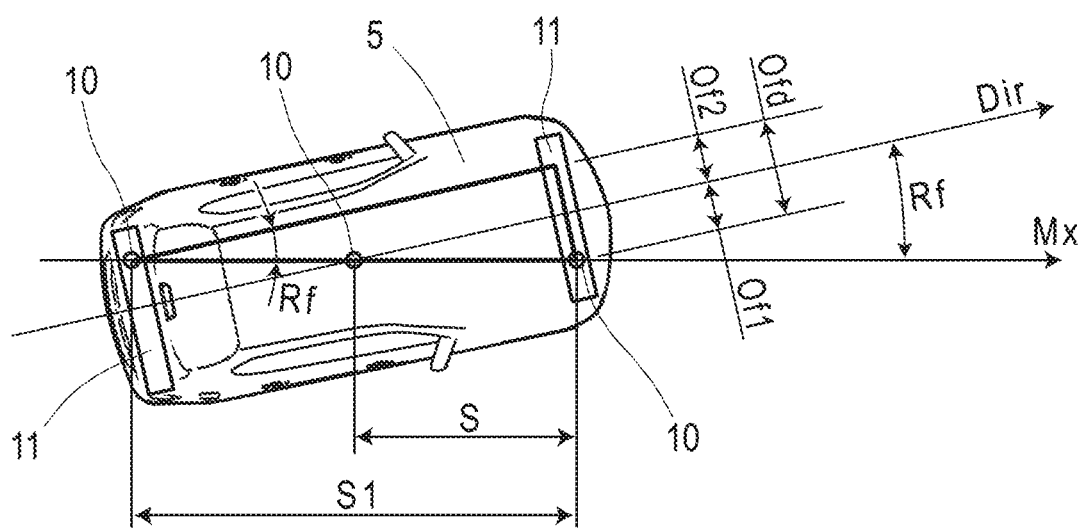

[FIG. 17]
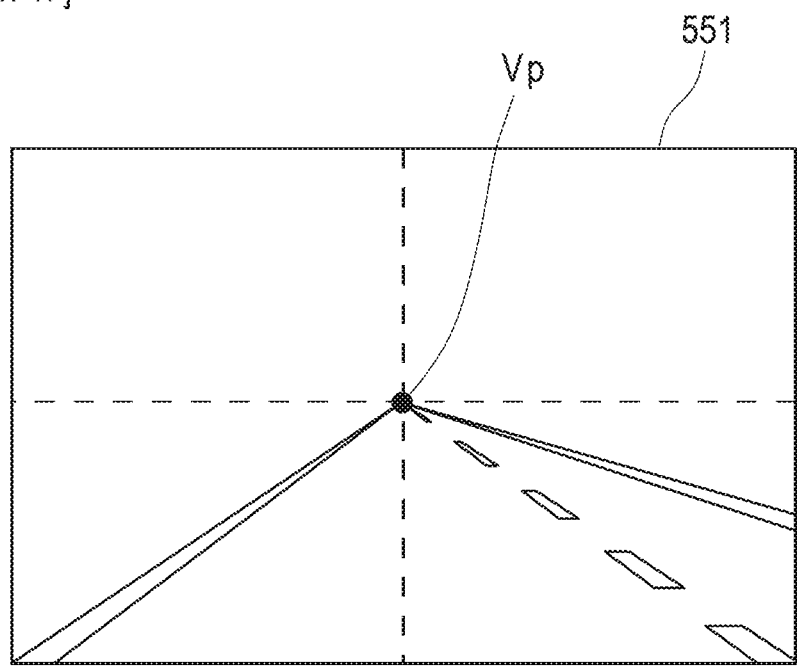

[FIG. 18]
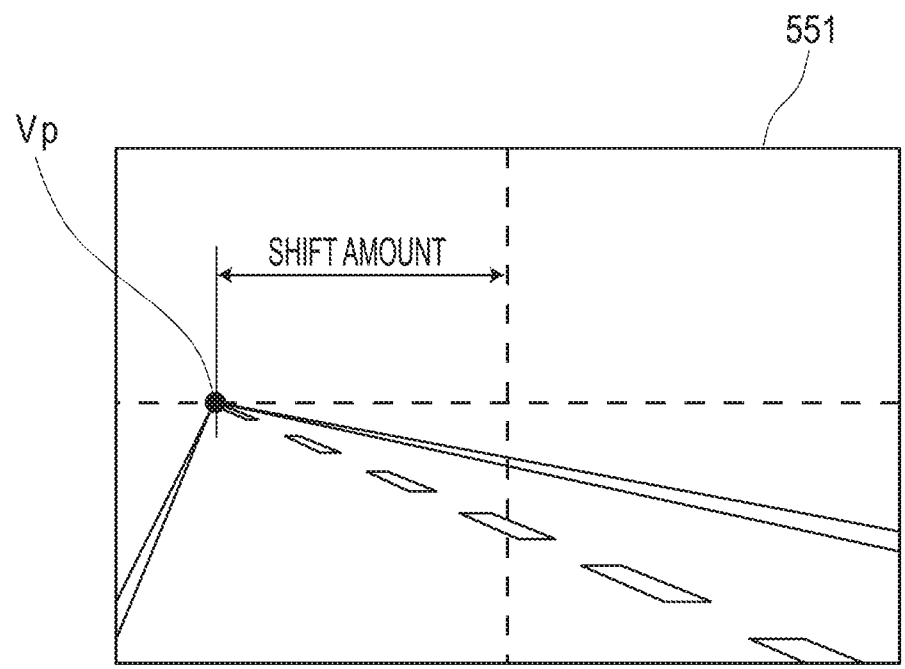

[FIG. 19]
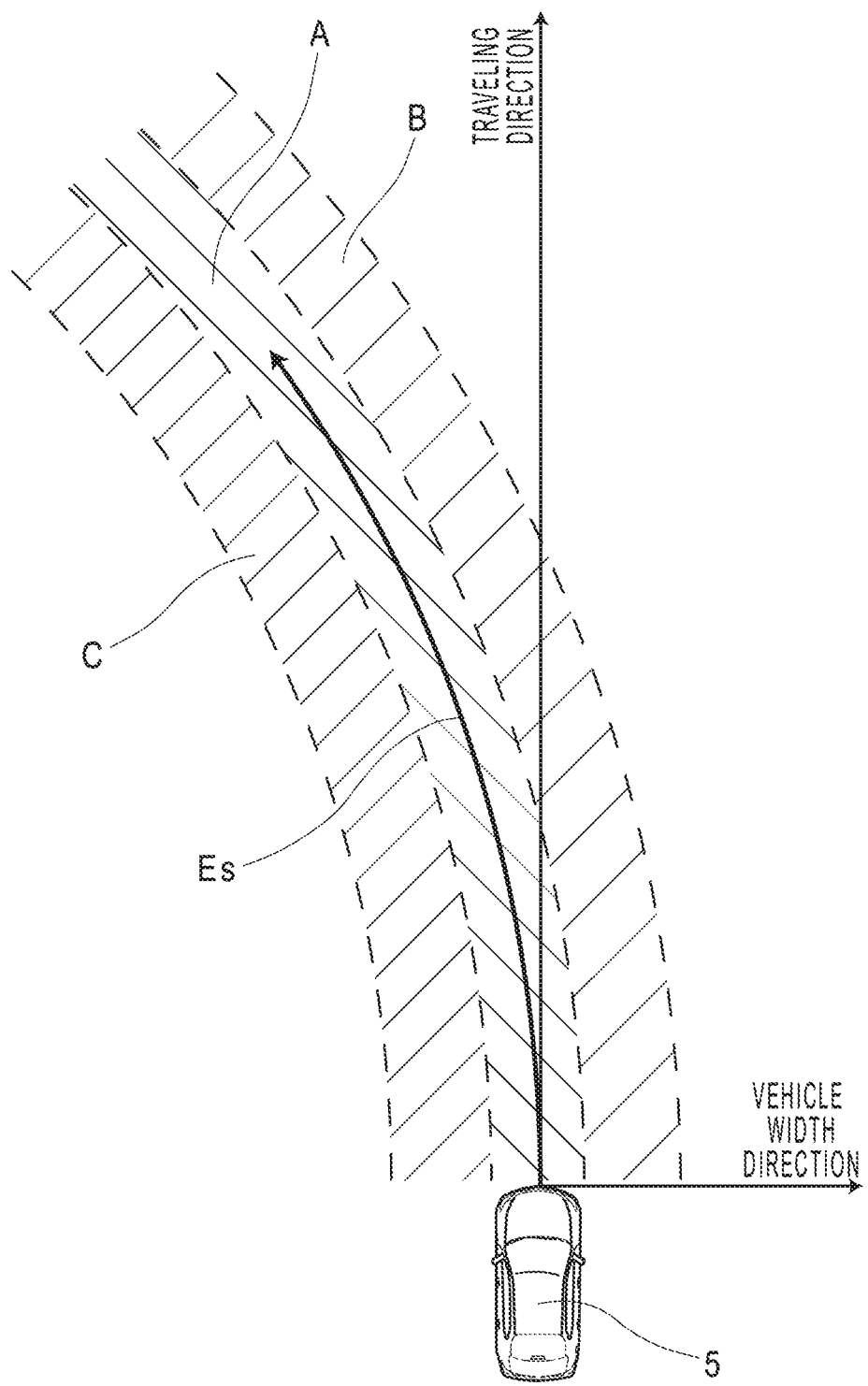

[FIG. 20]
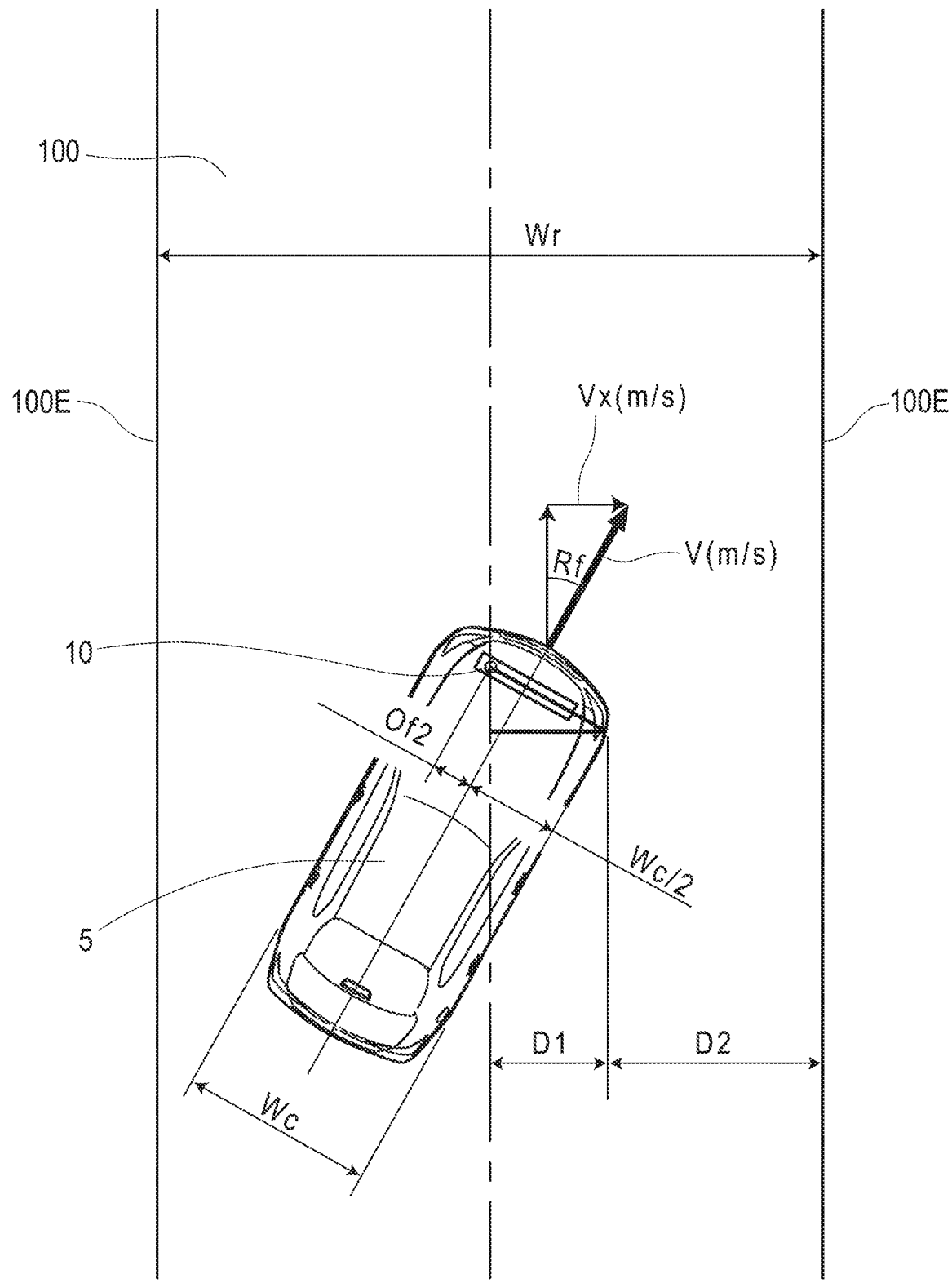

VEHICULAR SYSTEM AND COURSE ESTIMATION METHOD

CROSS-REFERENCE TO RELATED APPLICATIONS

The present application is based on PCT filing PCT/JP2017/030275, filed Aug. 24, 2017 which claims priority to JP 2016-168475, filed Aug. 30, 2016, the entire contents of which are incorporated herein by reference.

TECHNICAL FIELD

The present invention relates to a vehicle system and course estimation method for estimating a course direction of a vehicle.

BACKGROUND ART

In recent years, automated driving has been actively studied, and its actual use has been desired (for example, refer to Patent Literature 1). To achieve automated driving, it is imperative to grasp the surrounding environment of the vehicle with high accuracy, such as a road structure. The road structure and so forth can be acquired from map data in which data about the shape of the road, the lane width, the shape of a road shoulder, and so forth are made into detail.

CITATION LIST

Patent Literature

Patent Literature 1: Japanese Unexamined Patent Application Publication No. 2016-91412

SUMMARY OF INVENTION

Technical Problem

However, there is a problem in which, for example, a direction of a course to be traveled cannot be determined with high accuracy unless the traveling direction of the vehicle can be accurately grasped even if the surrounding environment of the own vehicle such as the road structure can be grasped.

The present invention was made in view of the conventional problem described above, and is to provide a vehicular system and course estimation method for estimating a traveling direction of a vehicle, for example, whether the vehicle is traveling along or crossing a traveling road.

Solution to Problem

One aspect of the present invention resides in a vehicular system including:
a lateral shift amount measurement part that measures a lateral shift amount, that is a positional deviation of a vehicle in a vehicle width direction with respect to a magnetic marker, and
a course estimation part that uses a difference between the lateral shift amounts with respect to two magnetic markers disposed with a space provided therebetween in a road surface where the vehicle travels and estimates a deviation of the vehicle in a traveling direction with respect to a line segment direction connecting the positions of the two magnetic markers.

One aspect of the present invention resides in a course estimation method in which a lateral shift amount, that is a positional deviation of a vehicle in a vehicle width direction, is measured with respect to each of two magnetic markers disposed with a space provided therebetween along a route direction of a traveling road of the vehicle and a difference between the lateral shift amounts with respect to the two magnetic markers is calculated, thereby estimating a deviation of the vehicle in a traveling direction with respect to the route direction.

The vehicular system of the one aspect measures the lateral shift amount with respect to each of the two magnetic markers and, by using a difference therebetween, estimates a deviation in the traveling direction of the vehicle with respect to the line segment direction connecting the positions of the two magnetic markers. The line segment direction is a direction defined by the two magnetic markers, and can serve as a reference direction. By identifying the deviation with respect to this line segment direction, the traveling direction of the vehicle can be estimated with high accuracy.

Also, according to the course estimation method of the one aspect, with the use of two magnetic markers disposed along the route direction of the traveling road, a deviation in the traveling direction of the vehicle with respect to the route direction can be estimated.

BRIEF DESCRIPTION OF DRAWINGS

FIG. 1 is a descriptive diagram depicting the configuration of a vehicular system in a first embodiment.

FIG. 2 is a front view of a vehicle with a sensor unit attached thereto in the first embodiment.

FIG. 3 is a block diagram depicting an electrical configuration of the vehicular system in the first embodiment.

FIG. 4 is a block diagram depicting the configuration of a magnetic sensor in the first embodiment.

FIG. 5 is a descriptive diagram exemplarily depicting a temporal change of a magnetic distribution in a vehicle width direction at the time of passage over a magnetic marker in the first embodiment.

FIG. 6 is a descriptive diagram exemplarily depicting a temporal change of a peak value of a magnetic measurement value at the time of passage over magnetic markers in the first embodiment.

FIG. 7 is a descriptive diagram of a method of measuring a lateral shift amount in the first embodiment.

FIG. 8 is a flow diagram depicting a flow of process by the vehicular system in the first embodiment.

FIG. 9 is a descriptive diagram of a detection duration of a second magnetic marker in the first embodiment.

FIG. 10 is a flow diagram depicting a flow of a course estimation process in the first embodiment.

FIG. 11 is a descriptive diagram depicting a relation between a difference Ofd between lateral shift amounts and a course deviation angle Rf at the time of passage over two magnetic markers in the first embodiment.

FIG. 12 is a descriptive diagram exemplarily depicting a situation in which the vehicle is traveling along a straight road in the first embodiment.

FIG. 13 is a descriptive diagram exemplarily depicting a situation in which the vehicle is diagonally traveling a straight road in the first embodiment.

FIG. 14 is a descriptive diagram exemplarily depicting a situation in which the vehicle is traveling along a curved road in the first embodiment.

FIG. 15 is a descriptive diagram exemplarily depicting a situation in which the vehicle is diagonally travelling a curved road in the first embodiment.

FIG. 16 is a descriptive diagram depicting a relation between a difference Ofd between lateral shift amounts and a course deviation angle Rf with respect to two magnetic markers in a second embodiment.

FIG. 17 is a diagram exemplarily depicting an image taken by an onboard camera of a vehicle traveling along a straight road in a third embodiment.

FIG. 18 is a diagram exemplarily depicting an image taken by an onboard camera of a vehicle diagonally traveling a straight road in the third embodiment.

FIG. 19 is a descriptive diagram exemplarily depicting three-dimensional estimation of a road structure in the third embodiment.

FIG. 20 is a descriptive diagram of departure warning in a fourth embodiment.

DESCRIPTION OF EMBODIMENTS

In the vehicular system of the present invention, it is preferable that the lateral shift amount measurement parts are arranged at at least two positions separated in a longitudinal direction of the vehicle with a space equal to the space between the two magnetic markers, and the course estimation part estimates the deviation in the traveling direction by using a difference between a lateral shift amount measured by a front-side lateral shift amount measurement part of two lateral shift amount measurement parts separated with the space equal to the space between the two magnetic markers with one magnetic marker positioned on a vehicle forwarding side of the two magnetic markers and a lateral shift amount measured by a rear-side lateral shift amount measurement part with another magnetic marker.

By using a difference between the lateral shift amounts measured with each of the two magnetic markers with the space equal to the space between the two lateral shift amount measurement parts, a deviation of the vehicle in the traveling direction with respect to the line segment direction connecting the positions of the two magnetic markers can be estimated with high accuracy.

In the vehicular system of the present invention, the two magnetic markers are preferably disposed along a route direction of a traveling road where the vehicle travels.

In this case, the line segment direction connecting the positions of the two magnetic markers coincides with the route direction of the traveling road, and thus a deviation of the vehicle in the traveling direction with respect to the route direction of the traveling road can be estimated.

The course estimation part preferably changes the space between the two magnetic markers for use in estimation of the deviation in accordance with a vehicle velocity.

In a low vehicle velocity zone, the steering angle of the steering wheel of the vehicle is large, and the traveling direction of the vehicle changes at a relatively short distance. On the other hand, in a high vehicle velocity zone, the steering angle is small, and there is a tendency to require a relatively long distance for the traveling direction of the vehicle to change. Therefore, a distance in which the traveling direction of the vehicle is regarded as constant tends to be shorter as the vehicle velocity is lower, and tends to be longer as the vehicle velocity is higher.

Therefore, the space between two magnetic markers for use in estimating the deviation is preferably longer as the velocity of the vehicle is higher and is shorter as the velocity of the vehicle is lower. For example, the space with which the magnetic markers are arranged may be varied between an expressway in a high vehicle velocity zone and an urban road in a low vehicle velocity zone. Alternatively, the magnetic markers may be arranged with a relatively short space that can correspond to a low vehicle velocity and a combination (space) of the two magnetic markers may be changed in accordance with the vehicle velocity.

The magnetic markers may be disposed along a lane that is a region of the vehicle to travel, and the system may include a prediction part that predicts at least one of a time and a distance until the vehicle departs from the lane by using the lateral shift amount, the deviation, and the vehicle velocity and a warning device which issues warning in accordance with the time or distance predicted by the prediction part.

By using the deviation, a time or a distance until the vehicle departs from the lane can be predicted with high accuracy. Using this time or distance allows departure warning with high accuracy. Furthermore, a combination of the lateral shift amount and the deviation allows departure warning with higher accuracy.

The magnetic markers may be disposed along a lane that is a region of the vehicle to travel, and the system may include a road structure estimation part that estimates a three-dimensional road structure with reference to the own vehicle by using the lateral shift amount and the deviation.

For example, when the traveling direction of the vehicle coincides with the direction of the lane and the deviation is almost zero, the possibility of the vehicle traveling along the lane is high. In this case, for example, it can be estimated that the course of the vehicle predicted from the steering angle of the vehicle coincides with the lane. With reference to this lane, a road side where guardrails, signs, and so forth are present and a road structure such as an opposing lane can be estimated.

The course estimation part may acquire information that can identify a deviation in the line segment direction with respect to a route direction of the traveling road where the vehicle travels, and may estimate the deviation of the vehicle in the traveling direction with respect to the route direction of the traveling road based on a deviation in the line segment direction with respect to the route direction identified by using this information and a deviation in the traveling direction of the vehicle with respect to the line segment direction.

If there is an error at the position of the magnetic marker, there is a possibility of increasing the deviation in the line segment direction with reference to the route direction of the traveling road, and it is difficult to determine whether the vehicle is traveling along the traveling road based on the deviation of the vehicle in the traveling direction with respect to the line segment direction. If the deviation in the line segment direction with respect to the route direction can be identified on a vehicle side, the deviation of the vehicle in the traveling direction with respect to the route direction of the traveling road can be estimated with high accuracy irrespective of a positional error of the magnetic marker.

The system may identify an absolute position of the vehicle at a time point when the deviation in the traveling direction of the vehicle is estimated by acquiring an absolute position of the magnetic marker.

Embodiments

Embodiments of the present invention are specifically described by using the following examples.

First Embodiment

The present example is an example regarding a vehicular system 1 for estimating a traveling direction of a vehicle 5 by using magnetic markers 10 laid in a road. Details about this are described by using FIG. 1 to FIG. 15.

The vehicular system 1 is configured to include, as in FIG. 1, a combination of a sensor unit 11 including magnetic sensors Cn (n is an integer from 1 to 15) and a control unit 12. In the following, after the magnetic markers 10 are generally described, the sensor unit 11, the control unit 12, and so forth configuring the vehicular system 1 are described.

The magnetic markers 10 are, as in FIG. 1 and FIG. 2, road markers laid in a road surface 100S of a lane 100 as a traveling road for the vehicle 5. The magnetic markers 10 are arranged every 2 m (marker span S=2 m) along the center of the lane 100 in a vehicle width direction. Note that the present example assumes that the lane 100 of a road in a relatively high speed zone such as an expressway.

The magnetic marker 10 is formed in a columnar shape having a diameter of 20 mm and a height of 28 mm, and can be accommodated in a hole provided to the road surface 100S. A magnet forming the magnetic marker 10 is an isotropic ferrite plastic magnet formed by dispersing a magnetic powder of iron oxide as a magnetic material in a polymer material as a base material, and has a characteristic of a maximum energy product (BHmax)=6.4 kJ/m$^3$. This magnetic marker 10 is laid in a state of being accommodated in the hole bored in the road surface 100S.

Specifications of the magnetic marker 10 of the present example are partially described in Table 1.

TABLE 1

| | |
|---|---|
| Type of magnet | Ferrite plastic magnet |
| Diameter | φ 20 mm |
| Height | 28 mm |
| Magnetic flux density Gs of the surface | 45 mT |

This magnetic marker 10 can act with magnetism having a magnetic flux density of 8 μT (8×10$^{-6}$ T, T: tesla) at a height of 250 mm, which is an upper limit of a range from 100 to 250 mm, assumed as an attachment height of the magnetic sensors Cn.

Next, the sensor unit 11 and the control unit 12 configuring the vehicular system 1 are described.

The sensor unit 11 is a unit attached to a vehicle body floor 50 corresponding to a bottom surface of the vehicle 5, as depicted in FIG. 1 to FIG. 3. The sensor unit 11 is attached, for example, near the inside of a front bumper. For example, in the case of the vehicle 5 of a sedan type, the attachment height with reference to the road surface 100S is approximately 200 mm.

The sensor unit 11 includes, as in FIG. 3, fifteen magnetic sensors Cn arrayed on a straight line along a vehicle width direction and a detection processing circuit 110 having a CPU not depicted and so forth incorporated therein.

The detection processing circuit 110 is an arithmetic circuit which performs various computation processes such as a marker detection process for detecting the magnetic marker 10. This detection processing circuit 110 is configured of a CPU (central processing unit) which performs various computations, and also by using elements such as memory elements including a ROM (read only memory) and a RAM (random access memory).

The detection processing circuit 110 performs marker detection process and so forth by acquiring a sensor signal outputted from each magnetic sensor Cn. The results of detection of the magnetic marker 10 computed by the detection processing circuit 110 including a measured lateral shift amount are all inputted to the control unit 12. Note that the sensor unit 11 can perform marker detection process in a period of 3 kHz.

Here, the configuration of the magnetic sensor Cn is described. In the present example, as in FIG. 4, a one-chip MI sensor having an MI element 21 and a driving circuit integrated therein is adopted as the magnetic sensor Cn. The MI element 21 is an element including an amorphous wire 211 made of a CoFeSiB-based alloy with approximately zero magnetostriction and a pickup coil 213 wound around this amorphous wire 211. The magnetic sensor Cn detects magnetism acting on the amorphous wire 211 by measuring a voltage occurring at the pickup coil 213 when a pulse current is applied to the amorphous wire 211. The MI element 21 has detection sensitivity in an axial direction of the amorphous wire 211 as a magneto-sensitive body. In each magnetic sensor Cn of the sensor unit 11 of the present example, the amorphous wire 211 is disposed along a vertical direction.

The driving circuit is an electronic circuit including a pulse circuit 23 which supplies a pulse current to the amorphous wire 211 and a signal processing circuit 25 which samples and outputs a voltage occurring at the pickup coil 213 at a predetermined timing. The pulse circuit 23 is a circuit including a pulse generator 231 that generates a pulse signal which is a base signal of a pulse current. The signal processing circuit 25 is a circuit which takes out an induced voltage of the pickup coil 213 via a synchronous detection 251 which is opened and closed in conjunction with a pulse signal, and amplifies the voltage by an amplifier 253 at a predetermined amplification factor. A signal amplified by this signal processing circuit 25 is externally outputted as a sensor signal.

The magnetic sensor Cn is a high-sensitivity sensor having a measurement range of a magnetic flux density of ±0.6 mT and a magnetic flux resolution of 0.02 μT within the measurement range. This high sensitivity is achieved by the MI element 21 using the MI effect in which the impedance of the amorphous wire 211 sensitively changes in accordance with the external magnetic field. Furthermore, this magnetic sensor Cn can perform high-speed sampling in a period of 3 kHz and supports high-speed vehicle traveling. In the present example, the period of magnetic measurement by the sensor unit 11 is set at 3 kHz. The sensor unit 11 inputs the detection result to the control unit 12 every time magnetic measurement is performed.

Specifications of the magnetic sensor Cn are partially described in Table 2.

TABLE 2

| | |
|---|---|
| Measuring range | ±0.6 mT |
| Magnetic flux resolution | 0.02 μT |
| Sampling period | 3 kHz |

As described above, the magnetic marker 10 can act with magnetism having a magnetic flux density equal to or larger than 8 µT (8×10⁻⁶ T) in a range of 100 to 250 mm assumed as an attachment height of the magnetic sensors Cn. The magnetic marker 10 acting with magnetism having a magnetic flux density equal to or larger than 8 µT is detectable with high reliability by using the magnetic sensor Cn having a magnetic flux resolution of 0.02 µT.

Next, the control unit 12 (FIG. 1 to FIG. 3) is a unit which controls the sensor unit 11 and estimates a traveling direction of the vehicle 5 by using the detection result of the sensor unit 11. The estimation result of the traveling direction of the vehicle 5 by the control unit 12 is inputted to a vehicle ECU not depicted, and is used for various vehicle controls for enhancing traveling safety, such as throttle control, brake control, and torque control of each wheel.

The control unit 12 includes an electronic board (omitted in the drawings) having implemented thereon memory elements such as a ROM and RAM, and so forth, in addition to a CPU which performs various computations. The control unit 12 controls the operation of the sensor unit 11 and estimates the traveling direction of the vehicle 5 by using a change of a lateral shift amount of the vehicle 5 with respect to the magnetic markers 10 laid along the lane 100.

The control unit 12 includes each of the following functions.
  (a) Duration setting part: when the sensor unit 11 detects the first magnetic marker 10, the part predicts a time point when the second magnetic marker 10 can be detected, and sets a temporal duration including the detectable time point as a detection duration.
  (b) Lateral shift amount difference computation part: the part computes a difference between lateral shift amounts with respect to two magnetic markers 10 laid along the lane 100.
  (c) Course estimation part: from the difference between the lateral shift amounts with respect to the two magnetic markers 10, the part identifies a course deviation angle as a deviation of the vehicle 5 in the traveling direction with respect to a lane direction, thereby estimating a traveling direction of the vehicle 5.

Next, description is made to each of the following: (1) a marker detection process for each sensor unit 11 to detect the magnetic marker 10, (2) a flow of entire operation of the vehicular system 1, and (3) a course estimation process.

(1) Marker Detection Process

The sensor unit 11 performs marker detection process in a period of 3 kHz by the control of the control unit 12. The sensor unit 11 performs sampling on magnetic measurement values indicated by sensor signals from fifteen magnetic sensors Cn for each of periods (p1 to p7) of performing a marker detection process to acquire a magnetic distribution in the vehicle width direction (refer to FIG. 5). A peak value of this magnetic distribution in the vehicle width direction becomes maximum at a timing of passage over the magnetic marker 10 as depicted in the drawing (in the period of p4 in FIG. 5).

When the vehicle 5 travels along the lane 100 (FIG. 1) where the magnetic markers 10 are laid, the peak value of the magnetic distribution in the vehicle width direction described above increases every time the vehicle passes over the magnetic marker 10 as in FIG. 6. In the marker detection process, a threshold determination regarding this peak value is performed, and it is determined that the magnetic marker 10 has been detected when the peak value is equal to or larger than a predetermined threshold value.

When detecting the magnetic marker 10, the sensor unit (lateral shift amount measurement part) 11 identifies the position of the peak value in the vehicle width direction of the magnetic distribution in the vehicle width direction, which is a distribution of magnetic measurement values of the magnetic sensors Cn. By using the position of this peak value in the vehicle width direction, a lateral shift amount of the vehicle 5 with respect to the magnetic marker 10 can be computed. In the vehicle 5, the sensor unit 11 is attached so that the central magnetic sensor C8 is positioned on the center line of the vehicle 5. Thus, a deviation in the position of the above-described peak value in the vehicle width direction with respect to the magnetic sensor C8 indicates the lateral shift amount of the vehicle 5 with respect to the magnetic marker 10. Note that positives and negatives of the lateral shift amounts are preferably different depending on which of left and right sides the peak value is positioned with respect to the position of the magnetic sensor C8.

In particular, as in FIG. 7, the sensor unit 11 of the present example performs curve approximation (quadratic approximation) on the magnetic distribution in the vehicle width direction, which is a distribution of magnetic measurement values of the magnetic sensors Cn, to identify the position of the peak value of an approximation curve in the vehicle width direction. Using the approximation curve can identify the position of the peak value with accuracy finer than a space between the fifteen magnetic sensors, and can measure the lateral shift amount of the vehicle 5 with respect to the magnetic marker 10 with high accuracy.

(2) Entire Operation of Vehicular System 1

The entire operation of the vehicular system 1 is described by using a flow diagram of FIG. 8, with the control unit 12 mainly as a subject.

The control unit 12 causes the sensor unit 11 to repeatedly perform the marker detection process described above until any magnetic marker 10 is detected (S101, a first detection step→S102: NO). When receiving from the sensor unit 11 an input indicating that the magnetic marker 10 has been detected (S102: YES), the control unit 12 sets a detection duration, which is a temporal duration in which the sensor unit 11 is caused to perform a new marker detection process (S103, a duration setting step).

Specifically, as in FIG. 9, the control unit 12 first adds a required time δta acquired by dividing the marker span S (refer to FIG. 1, a laying space between the magnetic markers 10, 2 m in the present example) by a vehicle velocity (velocity of the vehicle) V (m/second) measured by a vehicle velocity sensor to a time t1, which is a time point of detection of the first magnetic marker 10 by the sensor unit 11. With this addition of the required time δta to the time t1, it is possible to predict a time t2 as a time point when the sensor unit 11 can detect the new magnetic marker 10. The control unit 12 then sets, as a detection duration, a temporal section having a time (t2−δtb) acquired by subtracting a section time δtb acquired by dividing a reference distance (for example, 0.2 (m)) by the vehicle velocity V (m/second) from a time t2 as a start time and a time (t2+δtb) acquired by adding the section time δtb to the time t2 as an end time. Note that the reference distance can be changed as appropriate in consideration of the detection range and so forth of the sensor unit 11.

The control unit 12 causes the sensor unit 11 to repeatedly perform the marker detection process in the detection duration (FIG. 9) set at the above-described step S103 (S104: NO→S114, a second detection step). Details about this marker detection process is the same as the marker detection process for the first magnetic marker 10 at step S101.

If the sensor unit 11 was able to detect the second magnetic marker 10 in the detection duration (FIG. 9) (S104: YES→S105: YES), the control unit 12 performs (3) a course estimation process for estimating the traveling direction of the vehicle 5 (S106). On the other hand, if the sensor unit 11 was able to detect the first magnetic marker 10 (S102: YES) but was not able to detect the second magnetic marker 10 in the above-described detection duration (FIG. 9) (S104: YES→S105: NO), the control unit 12 returns to the marker detection process (S101) for detecting the first magnetic marker 10 to repeatedly perform the above-described series of processes.

(3) Course Estimation Process

The course estimation process (step S106 in FIG. 8) to be performed by the control unit 12 is a process including, as in FIG. 10, a step of computing a difference between lateral shift amounts measured by the sensor unit 11 when passing over two magnetic markers 10 (S201) and a step of computing a course deviation angle Rf, which is a deviation in a traveling direction with respect to a line segment direction connecting the positions of the two magnetic markers 10 (S202). The two magnetic markers 10 are laid at the center of the lane 100 so as to be along the lane direction, which is a route direction of the lane 100, and thus the above-described line segment direction represents a lane direction.

At step S201, as in FIG. 11, when the vehicle 5 passes over the magnetic markers 10 twice, a difference Ofd between a lateral shift amount Of1 measured with the first magnetic marker 10 and a lateral shift amount Of2 measured with the second magnetic marker 10 is computed by the following equation. Note that in the case of the drawing, positives and negatives are different between Of1 and Of2, and thus the absolute value of Ofd is a value acquired by adding absolute values of Of1 and Of2 together, in accordance with the difference.

$$Ofd=(Of1-Of2) \quad \text{[Equation 1]}$$

At step S202, as in FIG. 12, the course deviation angle Rf (deviation of an angle in a turning direction) is computed, which is a formed angle between a traveling direction Dir of the vehicle 5 and a line segment direction Mx (coinciding with the lane direction) connecting the positions of the two magnetic markers 10. This course deviation angle Rf is calculated by the following equation including the difference Ofd between the lateral shift amounts and the marker span S.

$$Rf=\arcsin(Ofd/S) \quad \text{[Equation 2]}$$

For example, when the vehicle 5 is traveling along the lane (FIG. 12), the course deviation angle Rf, which is a formed angle between the traveling direction Dir of the vehicle 5 and the line segment direction Mx connecting the positions of the two magnetic markers, becomes zero. On the other hand, when the vehicle diagonally travels the lane (FIG. 13), the traveling direction Dir of the vehicle 5 with respect to the line segment direction Mx is shifted to increase the course deviation angle Rf. Also, when the vehicle 5 is traveling along a curved road (FIG. 14), the line segment direction Mx connecting the positions of the two magnetic markers coincides with a tangent direction of the lane as the curved road, and the course deviation angle Rf, which is a "formed angle" between the traveling direction Dir of the vehicle 5 and the line segment direction Mx, becomes zero. On the other hand, when the vehicle diagonally travels the lane as a curved road (FIG. 15), a shift of the vehicle 5 in the traveling direction Dir with respect to the tangent direction of the lane as the curved road is increased and the course deviation angle Rf becomes larger.

As described above, the vehicular system 1 of the present example estimates the traveling direction of the vehicle 5 by using a difference between the lateral shift amounts with respect to two magnetic markers 10. The course deviation angle Rf, which is a traveling direction of the vehicle 5 to be estimated by this vehicular system 1 is not an absolute azimuth but is a "formed angle" with respect to the line segment direction Mx connecting the positions of the two magnetic markers 10. The line segment direction Mx is a direction that can serve as a reference defined by two magnetic markers 10 fixed in the road surface 100S, and thus an angular deviation in the traveling direction of the vehicle with respect to this line segment direction Mx can serve as an index indicating the traveling direction of the vehicle 5 with high accuracy.

In the vehicular system 1, the difference Ofd between the lateral shift amounts with respect to the two magnetic markers 10 is used to obtain the computed course deviation angle Rf as a deviation. In place of or in addition to this, a distance shift amount in a lateral direction with respect to the above-described line segment direction Mx predicted when the vehicle travels a predetermined distance, for example, 2 m ahead or 10 m ahead, may be obtained as a deviation.

Note that in the present example, the latest two adjacent magnetic markers 10 among the magnetic markers 10 laid every 2 m are used to estimate the traveling direction Dir of the vehicle 5. For example, a distance traveled per second by the vehicle at a velocity of 100 km per hour is 27.7 m, and thus a passage time for 2 m is 0.07 seconds, which is less than 0.1 seconds. In consideration of a reaction time of steering operation, the passage time may be 0.2 to 0.3 seconds. In this case, the traveling direction Dir may be estimated by using a combination of two adjacent magnetic markers 10 with a space of 4 m with one magnetic marker interposed therebetween or with a space of 6 m with two magnetic markers interposed therebetween. For example, as for the magnetic markers 10 arranged with a relatively dense space, such as a space of 1 m or a space of 2 m, a combination of two magnetic markers 10 with a wider space may be used as the velocity is higher, and a combination of two magnetic markers 10 with a narrower space may be used as the velocity is lower. Alternatively, the space between the magnetic markers 10 may be set to be relatively wide on a road such as an expressway, and the space between the magnetic markers 10 may be set to be relatively narrow on an ordinary road. Furthermore, in the present example, the magnetic markers 10 are arranged at a space of 2 m, and estimation of the traveling direction can be made for all magnetic markers 10. In place of this, for example, on a road where the magnetic markers 10 are arranged at a space of 10 m to 20 m for lane departure or automated driving, as for specific magnetic markers 10 with two or one magnetic marker interposed therebetween, a magnetic marker 10 for estimation of the traveling direction may be additionally arranged adjacently.

In the present example, a detection duration is set in which the first magnetic marker 10 is detected and then detection of the second magnetic marker 10 is tried. This detection duration is not a necessary configuration, and may be omitted. Alternatively, in case the detection duration is not set, it is preferable to always try the detection of the magnetic marker 10. In this case, reliability determination may be made in a manner such that there is a possibility of erroneous detection if the time point when the second magnetic marker 10 is detected is not included in a duration corresponding to the above-described detection duration with reference to the time point of detection of the first magnetic marker 10.

Note that the lateral shift amount Rf may be computed for every two adjacent magnetic markers 10 among three or more magnetic markers 10 and an average value of the plurality of lateral shift amounts Rf may be calculated. In this manner, a configuration may be adopted in which three or more magnetic markers 10 are used in estimating a deviation of the vehicle in the traveling direction.

Note that in the sensor unit 11, common noise acts on each magnetic sensor Cn, which is almost uniform magnetic noise derived from, in addition to geomagnetism, a large-sized magnetism generation source such as, for example, an iron bridge or another vehicle. This common noise has a high possibility of almost uniformly acting on each magnetic sensor Cn of the sensor unit 11. Thus, the magnetic marker 10 may be detected by using a differential value between the magnetic measurement values of the respective magnetic sensors Cn arrayed in the vehicle width direction. In this differential value indicating a magnetic gradient in the vehicle width direction, the common noise almost uniformly acting on each magnetic sensor Cn is effectively reduced.

In the present example, while the magnetic sensors Cn having sensitivity in the vertical direction are adopted, magnetic sensors having sensitivity in the traveling direction or magnetic sensors having sensitivity in the vehicle width direction may be adopted. Furthermore, for example, magnetic sensors having sensitivity in two axial directions of the vehicle width direction and the traveling direction, two axial directions of the vehicle width direction and the vertical direction, or two axial directions of the traveling direction and the vertical direction may be adopted. For example, a magnetic sensor having sensitivity in three axial directions of the vehicle width direction, the traveling direction, and the vertical direction may be adopted. Using a magnetic sensor having sensitivity in a plurality of axial directions can measure a magnetism acting direction together with the magnitude of magnetism and can generate magnetic vectors. By using a difference between the magnetic vectors and a change rate of the difference in the traveling direction, a distinction between magnetism of the magnetic markers 10 and disturbance magnetism can be made. Note that while the magnetic marker made of a ferrite plastic magnet is exemplarily described in the present example, a magnetic marker made of a ferrite rubber magnet may be adopted.

Second Embodiment

The present example is an example in which the course deviation angle Rf is computed by using the sensor units 11 provided in the front and rear of the vehicle 5 based on the vehicular system 1 of the first embodiment. Details about this are described with reference to FIG. 16.

In the vehicle 5, the sensor units 11 are arranged with a space of 4 m provided therebetween. On the other hand, as with the first embodiment, the magnetic markers 10 are arranged with the marker span S=2 m. 4 m as a space between the front and rear sensor units 11 coincides with the space of 4 m (taken as a marker span S1) between two magnetic markers 10 with one marker interposed therebetween. According to the sensor units 11 arranged with the space of 4 m, two adjacent magnetic markers 10 with one magnetic marker 10 interposed therebetween can be detected approximately at the same timing.

As in FIG. 16, when a lateral shift amount measured by the front-side sensor unit 11 is taken as Of1, a lateral shift amount measured by the rear-side sensor unit 11 is taken as Of2, and a difference therebetween is taken as Ofd, a lateral deviation angle Rf can be computed by the following equation.

$Rf=\arcsin(Ofd/S1)$ [Equation 3]

Note that the sensor unit 11 may be additionally arranged at the center between the front and rear sensor unit 11 with a space of 4 m. In this case, with at least either one of a combination of the front-side sensor unit 11 and the central sensor unit 11 and a combination of the rear-side sensor unit 11 and the central sensor unit 11, the magnetic markers 10 adjacent with a space of 2 m can be detected at the same timing to allow measurement of a lateral shift amount. Depending on the velocity, switching may be made between two magnetic markers 10 with a space of 2 m or two magnetic markers 10 with a space of 4 m.

Note that other configurations and operations and effects are the same as to those in the first embodiment.

Third Embodiment

The present example is an example in which a function of estimating a road structure is added based on the vehicular system 1 of the first embodiment. Details about this are described with reference to FIG. 17 to FIG. 19.

The present example is an example in which a two-dimensional road structure is estimated by using a course deviation angle Rf in an image 551 taken by an onboard camera installed so that the optical axis matches the center axis of the vehicle 5.

For example, when the vehicle 5 travels along a straight road, in the road structure in the taken image 551 acquired by the onboard camera, as in FIG. 17, a vanishing point Vp where a lane, a road, left and right lane marks, guardrails, and so forth vanish in the distance is positioned at the center of the screen.

On the other hand, when the vehicle 5 travels so as to diagonally deviate from the straight road to right, the vanishing point Vp where the lane and so forth vanish is positioned as being shifted to the left side of the screen as in FIG. 18. The shift amount of the vanishing point Vp at this time is determined by the ratio of the course deviation angle Rf with respect to the angle of view of the onboard camera. For example, if the ratio of the course deviation angle Rf with respect to the angle of view of the onboard camera in a horizontal direction is ½, the shift amount of the vanishing point Vp is a half of the screen width. For example, if the above-described ratio of the course deviation angle Rf is ½ when the position of the vanishing point Vp with the course deviation angle Rf=0 is at the center of the screen as in FIG. 17, the vanishing point Vp is shifted from the center by ½ of the screen width, and is positioned at an edge of the screen. Also, if the ratio of the course deviation angle Rf with respect to the angle of view of the onboard camera in the horizontal direction is ¼, the shift amount of the vanishing point Vp from the center of the screen is ¼ of the screen width.

As described above, if the traveling direction of the vehicle such as the course deviation angle Rf can be estimated, the position of the vanishing point Vp in the taken image 551 can be estimated, and the road structure in the taken image 551 can be grasped. If the position of the vanishing point Vp where the lane and so forth vanish is known, the region of the lane, the region on a road side, and so forth in the taken image 551 can be estimated. If this region estimation is possible, image recognition can be efficiently performed. For example, if the region of the lane can be estimated, a process for recognizing a lane mark which sections the lane can be efficiently performed, thereby allowing reduction in erroneous detection and an improvement in recognition rate. Also, for example, if the region on the road side can be estimated, a recognition rate of a sign, a signal light, and so forth installed on the road side can be improved.

Also, a three-dimensional road structure may be estimated. For example, when the vehicle 5 includes a sensor which measures a steering angle, a course Es of the vehicle 5 can be predicted by using the steering angle as in FIG. 19. Here, when the course deviation angle Rf is zero, a region A along the predicted course Es can be estimated as a region of a lane. Furthermore, if map information indicating that the road is for two-way traveling with each side having one lane can be acquired from map database or the like, for example, in the case of left-hand traffic, a region B on the right side of the region A can be estimated as a region of a counter traffic, and a region C on the left side of the region A can be estimated as a region on a road side. For example, when an object on the roadside such as a sign or guardrail is recognized by image recognition by an onboard camera, an active sensor such as a laser radar, or the like, the process is performed by taking the region C as a main subject, thereby allowing decrease in processing load and an improvement in efficiency. Also, for example, in a system which automatically switches to a low beam when passing an oncoming vehicle, the oncoming vehicle is captured by taking the region B as a main subject, thereby reducing malfunctions beforehand due to light from a street light or the like.

Also, for example, if map information indicating that the road has four lanes with each side having two lanes is acquired from map database or the like and information indicating that the lane being travelled is a center-side lane can be acquired from an infrastructure side, the region C can be estimated as a region of a parallel travel lane. As a method of providing information from the infrastructure side, for example, there is a method of providing information about lanes, with the polarity of the magnetic markers 10 being varied for each lane.

Note that other configurations and operations and effects are the same as to those in the first embodiment.

Fourth Embodiment

The present example is an example in which a function of lane departure warning is added to the vehicular system 1 of the first embodiment.

Details about this are described with reference to FIG. 20.

FIG. 20 exemplarily depicts a traveling situation in which the lane width is Wr and the vehicle 5 (vehicle width Wc) on the lane 100 where the magnetic markers 10 are arrayed along the center diagonally travels the lane 100 with the velocity V (m/second) and the course deviation angle Rf. Note that the drawing is a drawing of taking a bird's-eye view of a plane where the vehicle 5 travels and the horizontal direction in the drawing corresponds to the vehicle width direction and the vertical direction in the drawing corresponds to a forward direction. Also in the drawing, only the second magnetic marker 10 is depicted in the drawing, and depiction of the magnetic markers 10 including the first one is omitted.

Departure warning when the lateral shift amount measured with the magnetic marker 10 which the vehicle passes secondly is Of2 and the course deviation angle estimated at this time is Rf is described. This departure warning is a warning by a control part including functions as a prediction part which predicts a departure time described below and a warning device which issues departure warning.

With reference to the following equations 3 to 6, description is made to a procedure of computing a departure time, which is a time until the vehicle 5 departs from the lane 100 when the vehicle 5 is diagonally traveling the lane 100 with the course deviation angle Rf.

First, in FIG. 20, a distance D1 from the center of the lane 100 indicated by a one-dot-chain line to a side end of the vehicle 5 can be computed by the following equation.

$$D1=(Wc/2+Of2)\times\cos Rf \qquad \text{[Equation 4]}$$

Then, a distance D2 between a lane boundary (for example, a lane mark) 100E which is located in the forwarding direction of the diagonally traveling vehicle and a side of the vehicle 5 is as in the following equation.

$$D2=Wr/2-D1 \qquad \text{[Equation 5]}$$

On the other hand, of a velocity V (m/second) of the vehicle 5, a velocity component Vx (m/second) in the vehicle width direction is as in the following equation.

$$Vx=V\times\sin Rf \qquad \text{[Equation 5]}$$

Therefore, when the vehicle 5 travels at the velocity V (m/second) while keeping the course deviation angle Rf, a time Tr in the following equation required for reaching the boundary 100E of the lane 100 may be calculated as a departure time.

$$Tr=D2/Vx \qquad \text{[Equation 7]}$$

By using this departure time Tr, departure warning can be performed with high accuracy. For example, it may be such that no warning is issued if the departure time Tr is equal to or more than 20 seconds, moderate warning is issued when the departure time Tr is from 10 seconds to 20 seconds, and warning for calling attention or emergency warning is issued when the departure time Tr is equal to or less than 10 seconds. Note that a threshold of the departure time can be changed as appropriate. An example of moderate warning is a chime sound such as "ding dong". An example of emergency warning is a repeated buzzer sound such as "beep, beep, beep".

Note that in place of the departure time, a departure distance, which is a predicted distance to be traveled until the vehicle departs from the lane, may be computed, and departure warning may be issued in accordance with the magnitude of this departure distance. The departure distance can be calculated by multiplying the departure time Tr by a velocity component in the lane direction (V×cos Rf).

Note that other configurations and operations and effects are the same as to those in the first embodiment.

Fifth Embodiment

The present example is an example in which it is configured that a deviation of the vehicle in the traveling direction with respect to the route direction of the traveling road of the vehicle can be estimated based on the vehicular system of the first embodiment.

The laying positions of the magnetic markers in the traveling road have errors, and the line segment direction connecting the positions of adjacent magnetic markers does not necessarily coincide with the route direction of the traveling road. To enhance accuracy of this coincidence, cost for laying the magnetic markers may be increased. Thus, a technique is desired in which a deviation of the vehicle in the traveling direction with respect to the route direction of the traveling road is estimated with high accuracy while permitting errors in the laying positions of the magnetic markers to some extent.

The vehicular system of the present example is an example in which the above-described technique is achieved by configuring the system so that the system can acquire information that can identify the above-described deviation in the line segment direction with respect to the route direction of the traveling road.

In the first embodiment, the lateral deviation angle Rf indicating a first deviation of the vehicle in the traveling direction with respect to the above-described line segment direction is estimated. In this example, a second deviation in the line segment direction with respect to the route direction of the traveling road is identified and, based on this second deviation and the above-described first deviation, estimation of a third deviation of the vehicle in the traveling direction with respect to the route direction of the traveling road can be performed.

The following configurations are examples of a configuration for identifying a deviation (second deviation) in the line segment direction with respect to the route direction of the traveling road.

(1) A configuration in which map database is provided which stores map information including information about a shift of each magnetic marker in the vehicle width direction from the center of the traveling road, information about a shift of the detected magnetic marker is acquired from the map database, and a deviation (second deviation) in the line segment direction connecting the positions of two magnetic markers with respect to the route direction of the traveling road is identified.

(2) A configuration in which map database is provided which stores, in addition to information about the absolute position of the center of the traveling road, map information including the information about the absolute positions of the magnetic markers, the route direction of the traveling road is identified from the information about the absolute position of the center of the traveling road and the line segment direction connecting the positions of the magnetic markers is identified from the information about the absolute positions of the magnetic markers, and then a deviation (second deviation) in the line segment direction connecting the positions of the magnetic markers with respect to the route direction of the traveling road is identified.

Note that in either of the configurations described above, the map database may be stored in a storage medium equipped in the vehicle, or may be stored in a storage medium of a server device connectable via the Internet or the like.

A wireless communication RF-ID tag capable of operating upon reception of external power supply and wirelessly outputting information may be annexed to the magnetic marker, and a reception device which receives information about the above-described shift transmitted from the RF-ID tag may be provided on the vehicle side. Information about the absolute position of the center of the traveling road and information about the absolute position of the magnetic marker may also be transmitted from the RF-ID tag.

Other configurations and operations and effects are the same as to those in the first embodiment.

Sixth Embodiment

The present example is an example in which the absolute position of the vehicle when the deviation in the traveling direction of the vehicle is estimated can be identified based on the vehicular system of the first embodiment.

In the vehicular system of the present example, information indicating the absolute positions of the magnetic markers can be acquired from the map database, and the absolute position of the vehicle can be identified from the absolute positions of the detected magnetic markers. The map database may be stored in a storage medium equipped in the vehicle, or may be stored in a storage medium of a server device connectable via the Internet or the like.

If the absolute position of the vehicle can be identified, for example, with reference to the database storing the map information which can identify the route direction of the traveling road, the shape and so forth of the forward traveling road of the vehicle can be grasped. And, by comparing the shape of the forward traveling road and the estimated deviation of the traveling direction of the vehicle, a degree of danger and so forth as to the estimated traveling direction of the vehicle can be estimated. For example, when the vehicle traveling on the right-side lane reaches the position before a left curve and the deviation in the traveling direction of the vehicle is toward the right, it can be estimated that the degree of danger is high.

Note that other configurations and operations and effects are the same as to those in the first embodiment.

While specific examples of the present invention have been described in detail in the foregoing as in the examples, these specific examples each merely disclose an example of technology included in the scope of claims for patent. Needless to say, the scope of claims for patent should not be construed as being limited by the configuration, numerical values, and so forth of the specific examples. The scope of claims for patent includes techniques acquired by variously modifying, changing, or combining the above-described specific examples by using known technology, knowledge of people skilled in the art, and so forth.

REFERENCE SIGNS LIST

1 vehicular system
10 magnetic marker
100 lane
11 sensor unit (lateral shift amount measurement part)
110 detection processing circuit
12 control unit (course estimation part)
21 MI element
5 vehicle

The invention claimed is:

1. A vehicular system for estimating a traveling direction of a vehicle, comprising:
 a sensor configured to detect a first magnetic marker laid on a road, and measure a lateral shift amount, that is a positional deviation of the vehicle in a vehicle width direction of the vehicle with respect to the first magnetic marker; and
 processing circuitry configured to
  set, in response to the sensor detecting the first magnetic marker, a temporal duration including a time point of when the sensor is predicted to detect a second magnetic marker after detecting the first magnetic marker as a detection duration for the sensor to detect the second magnetic marker, calculate a difference between the lateral shift amounts with respect to the first and the second magnetic markers disposed with a space provided therebetween on the road on which the vehicle travels, and estimate a deviation of the vehicle in the traveling direction with respect to a line segment direction connecting positions of the first and the second magnetic markers based on the calculated difference, wherein the sensor is configured to repeatedly perform a magnetic marker detection process only during the temporal duration set by the processing circuitry to detect the second magnetic marker.

2. The vehicular system according to claim 1, wherein the sensor and another sensor are arranged at at least two positions separated in a longitudinal direction of the vehicle with a space equal to the space between the first and the second magnetic markers, and the processing circuitry estimates the deviation of the vehicle in the traveling direction with respect to the line segment direction by using a difference between a lateral shift amount measured by a front-side sensor of the sensor and the other sensor separated with the space equal to the space between the first and the second magnetic markers with one magnetic marker positioned on a vehicle forwarding side of the first and the second magnetic markers and a lateral shift amount measured by a rear-side sensor of the sensor and the other sensor with another magnetic marker.

3. The vehicular system according to claim 1, wherein the first and the second magnetic markers are disposed along a route direction of a traveling road where the vehicle travels.

4. The vehicular system according to claim 2, wherein the first and the second magnetic markers are disposed along a route direction of a traveling road where the vehicle travels.

5. The vehicular system according to claim 1, wherein the processing circuitry changes the space between the first and the second magnetic markers for use in estimation of the deviation of the vehicle in the traveling direction with respect to the line segment direction in accordance with a vehicle velocity.

6. The vehicular system according to claim 1, wherein the processing circuitry changes the space between the first and the second magnetic markers for use in estimation of the deviation of the vehicle in the traveling direction with respect to the line segment direction in accordance with a vehicle velocity.

7. The vehicular system according to claim 1, wherein the magnetic markers are disposed along a lane that is a region of the vehicle to travel, the processing circuitry predicts at least one of a time and a distance until the vehicle departs from the lane by using the lateral shift amount, the deviation of the vehicle in the traveling direction with respect to the line segment direction, and the vehicle velocity, and the processing circuitry controls issuing warning in accordance with the time or the predicted distance.

8. The vehicular system according to claim 2, wherein the magnetic markers are disposed along a lane that is a region of the vehicle to travel, and the processing circuitry predicts at least one of a time and a distance until the vehicle departs from the lane by using the lateral shift amount, the deviation of the vehicle in the traveling direction with respect to the line segment direction, and the vehicle velocity, and the processing circuitry controls issuing warning in accordance with the time or the predicted distance.

9. The vehicular system according to claim 3, wherein the magnetic markers are disposed along a lane that is a region of the vehicle to travel, and the processing circuitry predicts at least one of a time and a distance until the vehicle departs from the lane by using the lateral shift amount, the deviation of the vehicle in the traveling direction with respect to the line segment direction, and the vehicle velocity, and the processing circuitry controls issuing warning in accordance with the time or the predicted distance.

10. The vehicular system according to claim 1, wherein the magnetic markers are disposed along a lane that is a region of the vehicle to travel, and the processing circuitry estimates a two-dimensional road structure or a three-dimensional road structure of the road with reference to the vehicle by using the lateral shift amount and the deviation of the vehicle in the traveling direction with respect to the line segment direction.

11. The vehicular system according to claim 2, wherein the magnetic markers are disposed along a lane that is a region of the vehicle to travel, and the processing circuitry estimates a two-dimensional road structure or a three-dimensional road structure of the road with reference to the vehicle by using the lateral shift amount and the deviation of the vehicle in the traveling direction with respect to the line segment direction.

12. The vehicular system according to claim 3, wherein the magnetic markers are disposed along a lane that is a region of the vehicle to travel, and the processing circuitry estimates a two-dimensional road structure or a three-dimensional road structure of the road with reference to the vehicle by using the lateral shift amount and the deviation of the vehicle in the traveling direction with respect to the line segment direction.

13. The vehicular system according to claim 1, wherein the processing circuitry acquires information that can identify a deviation in the line segment direction with respect to a route direction of the traveling road where the vehicle travels, and estimates the deviation of the vehicle in the traveling direction with respect to the route direction of the traveling road based on a deviation in the line segment direction with respect to the route direction identified by using the information that can identify the deviation in the line segment direction and a deviation in the traveling direction of the vehicle with respect to the line segment direction.

14. The vehicular system according to claim 2, wherein the processing circuitry acquires information that can identify a deviation in the line segment direction with respect to a route direction of the traveling road where the vehicle travels, and estimates the deviation of the vehicle in the traveling direction with respect to the route direction of the traveling road based on a deviation in the line segment direction with respect to the route direction identified by using the information that can identify the deviation in the line segment direction and a deviation in the traveling direction of the vehicle with respect to the line segment direction.

15. The vehicular system according to claim 1, wherein the processing circuitry identifies an absolute position of the vehicle at a time point when the deviation in the traveling direction of the vehicle is estimated by acquiring an absolute position of the magnetic marker.

16. The vehicular system according to claim 2, wherein the processing circuitry identifies an absolute position of the vehicle at a time point when the deviation in the traveling direction of the vehicle is estimated by acquiring an absolute position of the magnetic marker.

17. A course estimation method for estimating a traveling direction of a vehicle, comprising:
- detecting, using a sensor, a first magnetic marker laid on a road, and measure a lateral shift amount, that is a positional deviation of the vehicle in a vehicle width direction of the vehicle with respect to the first magnetic marker;
- setting, using processing circuitry, in response to the sensor detecting the first magnetic marker, a temporal duration including a time point of when the sensor is predicted to detect a second magnetic marker after detecting the first magnetic marker as a detection duration for the sensor to detect the second magnetic marker;
- calculating, using the processing circuitry, a difference between the lateral shift amounts with respect to the first and the second magnetic markers disposed with a space provided therebetween on the road on which the vehicle travels, and
- estimating, using the processing circuitry, a deviation of the vehicle in the traveling direction with respect to a line segment direction connecting positions of the first and the second magnetic markers based on the calculated difference, wherein
the sensor is configured to repeatedly perform a magnetic marker detection process only during the temporal duration set by the processing circuitry to detect the second magnetic marker.

18. The vehicular system according to claim 10, wherein the processing circuitry estimates a region configuring road structure of the road based on the estimated two-dimensional road structure or three-dimensional road structure.

19. The vehicular system according to claim 13, wherein a RF-ID tag capable of wirelessly outputting information is annexed to the first and the second magnetic markers respectively, and
the processing circuitry acquires the information that can identify the deviation by using the information output from the RF-ID tag.

20. The course estimation method according to claim 17, wherein
the sensor and another sensor are arranged on the vehicle at at least two positions separated in a longitudinal direction of the vehicle with a space equal to the space between the first and the second magnetic markers, and
the method further comprises estimating, using the processing circuitry, the deviation of the vehicle in the traveling direction with respect to the route direction by using a difference between the lateral shift amount measured by a front-side sensor of the sensor and the other sensor separated with the space equal to the space between the first and the second magnetic markers with one magnetic marker positioned on a vehicle forwarding side of the first and the second magnetic markers and the lateral shift amount measured by a rear-side sensor of the sensor and the other sensor with another magnetic marker.

21. The vehicular system according to claim 1, wherein the processing circuitry is configured to control the sensor to perform the magnetic marker detection process only during the temporal duration, and not to perform the magnetic marker detection process during time other than the temporal duration.

* * * * *